United States Patent
Kessler et al.

(10) Patent No.: US 8,760,277 B2
(45) Date of Patent: Jun. 24, 2014

(54) METHOD FOR ALLOCATING IDENIFICATION CODES OF WHEEL ELECTRONIC DEVICES OF A TIRE PRESSURE MONITORING SYSTEM OF A VEHICLE TO THE POSITIONS OF THE WHEELS ON THE VEHICLE

(76) Inventors: Ralf Kessler, Pfinztal (DE); Markus Wagner, Ludwigsburg (DE); Andreas Kraft, Gondelsheim (DE); Jürgen Schönbeck, Bretten (DE); Peter Brand, Kieselbronn (DE); Markus Adrian Alexander, Karlsruhe (DE)

( * ) Notice: Subject to any disclaimer, the term of this patent is extended or adjusted under 35 U.S.C. 154(b) by 154 days.

(21) Appl. No.: 13/359,405

(22) Filed: Jan. 26, 2012

(65) Prior Publication Data
US 2012/0194333 A1 Aug. 2, 2012

(51) Int. Cl.
  B60C 23/00 (2006.01)
  B60C 23/04 (2006.01)
  B60C 23/06 (2006.01)
  B60C 23/08 (2006.01)

(52) U.S. Cl.
  CPC ............ B60C 23/0408 (2013.01); B60C 23/06 (2013.01); B60C 23/08 (2013.01)
  USPC ......................................... 340/445; 340/442

(58) Field of Classification Search
  CPC .... B60C 23/0408; B60C 23/06; B60C 23/08; B60C 8/1755
  USPC ........ 340/445, 442, 443; 180/167; 701/72, 49
  See application file for complete search history.

(56) References Cited

U.S. PATENT DOCUMENTS

| 5,808,190 | A | 9/1998 | Ernst |
| 6,633,229 | B1 | 10/2003 | Norman et al. |
| 7,367,227 | B2 * | 5/2008 | Stewart et al. ................ 340/443 |
| 8,332,103 | B2 * | 12/2012 | Greer et al. ..................... 701/49 |
| 8,332,104 | B2 * | 12/2012 | Greer et al. ..................... 701/49 |
| 8,498,785 | B2 * | 7/2013 | Juzswik et al. ................ 701/49 |
| 2013/0079977 | A1 * | 3/2013 | Greer et al. ................. 701/34.4 |

FOREIGN PATENT DOCUMENTS

DE 19856861 B4 8/2004
EP 0806306 B1 8/2003

* cited by examiner

Primary Examiner — John A Tweel, Jr.
(74) Attorney, Agent, or Firm — Keith H. Orum; Orum & Roth, LLC

(57) ABSTRACT

Method for allocating identification codes which are contained in signals transmitted by components of a tire pressure monitoring system, said components being attached to wheels of the vehicle, to the wheel positions. A plurality of sensors to the tire pressure, to the rolling direction of the wheel, to the shocks, as well as a memory for the identification code, and a transmitter which supplies signals with the identification code, the rolling direction and the occurrence of a shock on a wheel to a receiver which, based on the supplied rolling direction information, distinguishes identification codes pertaining to wheels on the left-hand or right-hand side of the vehicle from shocks which occur on the left-hand or right-hand side of the vehicle, measures the time interval elapsing between shock signals on one side of the vehicle, multiplies this time interval by the velocity of the vehicle measured within the same time interval.

16 Claims, 1 Drawing Sheet

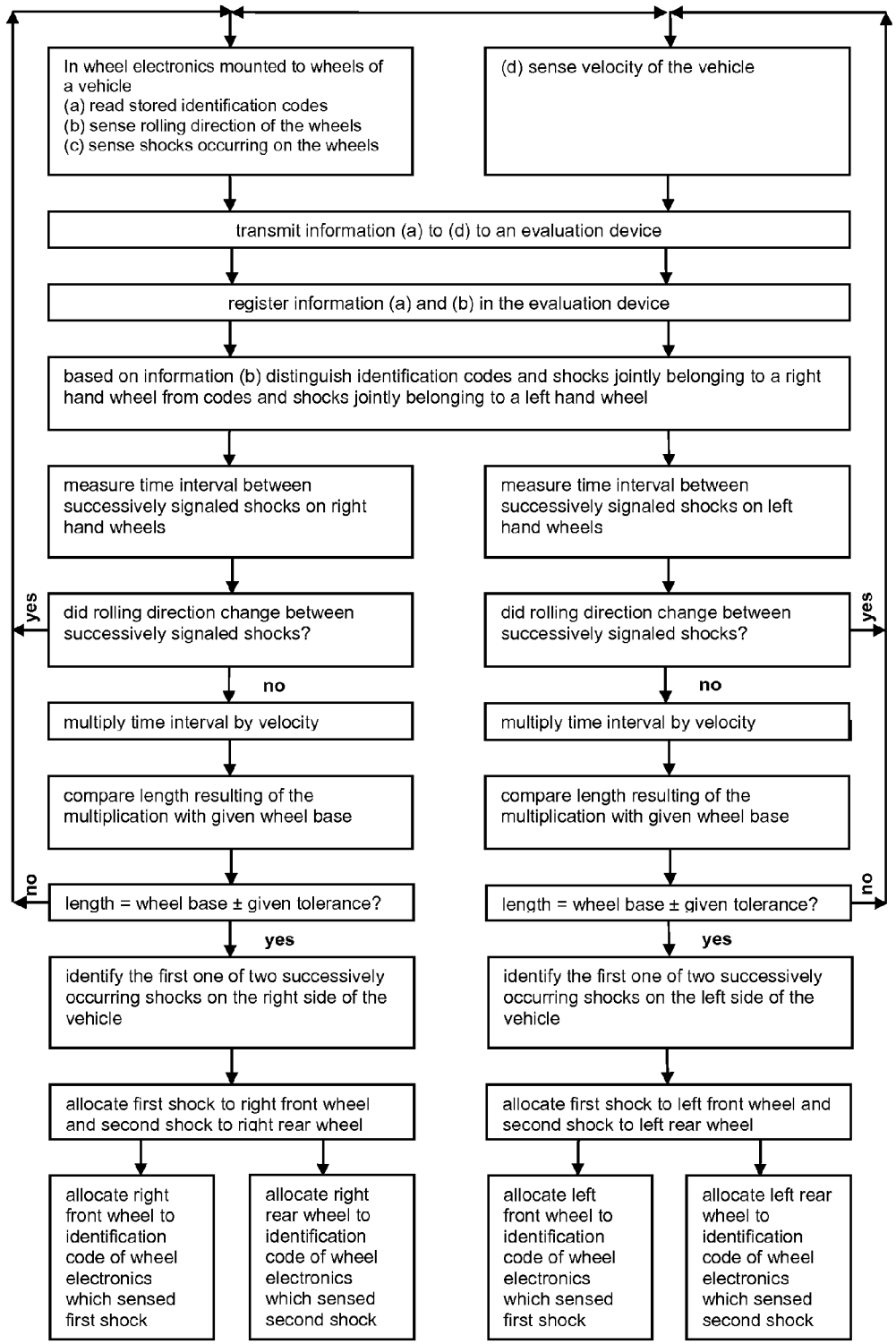

METHOD FOR ALLOCATING IDENIFICATION CODES OF WHEEL ELECTRONIC DEVICES OF A TIRE PRESSURE MONITORING SYSTEM OF A VEHICLE TO THE POSITIONS OF THE WHEELS ON THE VEHICLE

FIG. 1 is a flowchart of the invention.

The invention relates to a method for allocating identification codes which are contained in signals that are transmitted by components of a tire inflation pressure, monitoring system of a vehicle, said components being attached to wheels mounted to the vehicle, to the positions of the wheels on the vehicle. The components attached to the wheels of the vehicle are hereinafter referred to as wheel electronic devices or shortly as wheel electronics. Each wheel electronic device contains a pressure sensor which responds to the tire inflation pressure of the wheel, a motion sensor, more particularly an acceleration sensor supplying information about the speed of the wheel, a memory in which an individual identification code of the wheel electronics is stored, and a transmitter which transmits signals to a receiver which is provided with or connected to an antenna provided on the body of the vehicle as well as to an evaluation device, said signals not only containing the individual identification code but also information about the speed of the particular wheel. Usually, the antenna is attached to the bottom side of the body. It can be connected to the receiver by means of a cable, said receiver decoding and, if necessary, amplifying the signals received and/or processing said signals in any other manner or it can, as a whole or in part, be combined with the antenna to form an assembly. In general, the evaluation device is arranged at a distance from the antenna in the engine compartment or in the interior of the vehicle, e.g., behind the instrument panel. The receiver can be combined with the evaluation device to form an assembly or implemented separately therefrom. Finally, the receiver can also be divided into a first part that is assigned to the antenna and a second part that is assigned to the evaluation device.

The evaluation device which is, sometimes, also referred to as the central processing unit of the tire pressure monitoring system evaluates the signals transmitted by the wheel electronics and displays to the driver any anomalies of the tire inflation pressure, for which purpose the evaluation device is, in general, connected to a display provided in the instrument panel of the vehicle. The connections between the evaluation device and the display and, where appropriate, the receiver, is usually achieved via cables, e.g., via a BUS system provided in the vehicle.

To be able to display the wheel at which an anomaly of the tire inflation pressure—hereinafter also referred to as tire pressure—occurs, the evaluation device must know the wheel at which a wheel electronic device signaling the anomaly of the tire pressure is disposed. To achieve this, the wheel electronics transmit in their signals an individual identification code along with information about the tire pressure, said identification code usually being a string of digits which uniquely identifies the individual wheel electronic device. To enable the evaluation device to allocate a string of digits communicated to it to a specific wheel or a specific wheel position, the identification codes of the wheel electronics installed in the vehicle and their allocation to the wheel positions must have been communicated to it and stored in the evaluation device or in a memory connected to the evaluation device beforehand. There are known allocation methods in this context.

As is known from EP 0 806 306 B1, a motion sensor, i.e., an acceleration sensor, is provided in the wheel electronics, said acceleration sensor responding to radial accelerations and/or tangential accelerations occurring on the wheel. Such an acceleration sensor allows not only distinguishing a resting vehicle from a stationary vehicle but also provides information about the speed of the wheel. That is to say that the acceleration due to gravity superposes the radial acceleration and the tangential acceleration, the influence of said acceleration due to gravity changing its sign two times on each revolution of the wheel. The reciprocal value of the time interval elapsing between every two sign changes of the superposition of the acceleration signal that is caused by the acceleration due to gravity is proportional to the speed of the wheel.

The method known from EP 0 806 306 B1 compares the speed obtained from the acceleration sensor in the wheel electronics with the speeds which were supplied for the same time interval by ABS sensors on the wheels of the vehicle (with ABS standing for antilock brake system). If it is detected that the speed measurement originating from the wheel electronics corresponds to a speed measurement originating from an ABS sensor, then it is assumed that the ABS sensor and the particular wheel electronic device are allocated to the same wheel position, e.g., at the left front of the vehicle. However, this requires that the speed measurement originating from the wheel electronic device corresponds to the speed measurement of only one of the ABS sensors. In this case, the identification code is stored under the position of the ABS sensor from which the corresponding speed signal arrived. In case of future signals which contain the same identification code, the evaluation device will then know the wheel or wheel position, e.g., at the left front, from which the signal originates.

The known allocation method requires that the wheels comprise differences in the speeds when the speeds are compared. These differences may have different causes, e.g., slip between wheel and roadway, different rolling radiuses due to different tire sizes or due to different loads or due to different tire pressures and, in particular, due to cornering. Wheels on the outside of the curve always cover a longer distance than the wheels on the inside of the curve for which reason they rotate faster than the wheels on the inside of the curve. The speed differences between the wheels of a vehicle may be small, and even negligibly small in case of straight-ahead driving. For this reason, EP 0 806 306 B1 requires that two speed values, one of which was measured by means of the acceleration sensor in a wheel electronic system and the other one of which was measured by means of an ABS sensor, be considered as corresponding only if they correspond to each other except for inequalities that cannot be avoided from a measurement-engineering point of view. Only if such a high-degree correspondence is detected once for only one of the ABS sensors will the identification code of the wheel electronic system allocated precisely to that ABS sensor that has supplied the corresponding speed signal. This is to disadvantage in that it may take a very long time until the evaluation device has allocated every one of all the identification codes it receives to a specific ABS sensor and, therefore, to a specific wheel position. Furthermore, the known method is susceptible to incorrect allocations. But as long as the identification codes of the wheel electronic systems installed in the vehicle are not correctly allocated to the wheel positions, reliable tire pressure control is not possible. For this reason, the method known from EP 0 806 306 B1 did not find its way into practice.

DE 198 56 861 B4 discloses an automatic allocation method which allows uniquely allocating the identification codes to the wheel positions within a short time based on the evaluation of a rolling direction information provided by an acceleration sensor in the particular wheel electronic device and on the signal levels received. However, this requires that the receiving antenna be arranged at an eccentric point of the body floor as a prerequisite for ensuring that the signals that are transmitted by the wheel electronics at equal power are received by the receiving antenna with different signal levels. This possibility of applying an allocation method quickly and reliably is actually a good possibility but is out of the question if a central position is desired for the receiving antenna at which position it can receive signals from all directions in equally good quality if possible, e.g., including the signals of a remote key which can impinge on the receiving antenna from any direction.

It is an object of the present invention to provide an allocation method which leads to success more reliably and/or quickly than the method known from EP 0 806 306 B1.

This object is solved by a method according to the invention, which allocates identification codes which are contained in signals which are transmitted by components of a tire pressure monitoring system of a vehicle, said components being referred to as wheel electronic devices or wheel electronics below, to the positions of the wheels mounted to the vehicle on which the vehicle is driving.

The method utilizes wheel electronics which comprise a plurality of sensors one of which responds to the tire pressure of the wheel, one of which provides information about the rolling direction of the wheel, and one of which responds to shocks occurring on the wheel. The wheel electronics may comprise further sensors, e.g., a sensor which measures the temperature in the tire. The wheel electronics have a memory in which the individual identification code of the particular wheel electronic device is stored. Usually, the identification code consists of a string of digits which is to facilitate distinguishing the wheel electronics, which is easier the more digits the string of digits contains. contains. The wheel electronics have a transmitter which transmits radio signals containing information about the rolling direction of the particular wheel and about the occurrence of a shock on the same wheel. From case to case, the transmitter also transmits signals containing information about the tire pressure, especially if the tire pressure is outside of a normal pressure range or drops at an exceptionally fast rate. The signals transmitted by the transmitter also contain the individual identification code of the particular wheel electronic device to allow determining the wheel from which the signals arrive.

The signals are transmitted to a receiver which is carried along by the vehicle and is provided with or connected to an antenna for the reception of the signals as well as an evaluation device.

Furthermore a velocity signal indicating the driving speed of the vehicle is supplied to the evaluation device.

The evaluation device registers the identification codes and rolling direction information contained in the signals received, based on the registered rolling direction information, distinguishes identification codes pertaining to wheel electronic devices on wheels on the left-hand side of the vehicle from identification codes pertaining to wheel electronic devices on wheels on the right-hand side of the vehicle, distinguishes shocks about which it was informed by wheel electronic devices on the left-hand side of the vehicle from shocks about which it was informed by wheel electronic devices on the right-hand side of the vehicle, measures the time interval elapsing between shock signals successively signaled by wheel electronic devices on the left-hand side of the vehicle or by wheel electronic devices on the right-hand side of the vehicle, respectively, multiplies the measured time interval by a velocity of the vehicle that was measured within the same time interval and signaled to the evaluation device, checks whether the length calculated by this multiplication corresponds to a given wheelbase of the vehicle within a specified tolerance, in case of correspondence, allocates the identification code contained in the signal having contained the information about the first of two successively registered shocks on the left-hand side or of two successively registered shocks on the right-hand side of the vehicle to the left or right wheel, respectively, on a forward one of the two axles during forward driving and allocates the identification code contained in the signal having contained the information about the second one of the two successively registered shocks to the wheel on the rearward one of the two axles on the same side of the vehicle as that on the forward axle.

A distinction between forward driving and rearward driving can be made in different ways; one way is to inquire the switching position of the gear of the vehicle, another one to evaluate a speedometer signal which reverses its sign when the driving direction is reversed. As regards the method according to the invention, it is sufficient to take only those signals into consideration which occur either during forward driving or during rearward driving. In any case, the signals occurring during forward driving are, preferably, evaluated because forward driving generally outbalances rearward driving and, therefore, leads to a faster allocation. It is, however, also possible to evaluate both the signals that occur during forward driving and the signals that occur during rearward driving.

If two shocks occur at the same time on two wheels with different rolling directions, then it can be assumed that they originate from a right-hand wheel and a left-hand wheel on a common axle. Such events can be attributed to changes in the condition of the roadway which extend over the entire width of the lane, such as changes in the road pavement or expansion joints or steps in the roadway. Here, occurrence at the same time is not to be understood in the strict mathematical sense of "simultaneous" but rather in a practical sense as the occurrence within a time interval which depends on the driving speed and is, for example, obtained by dividing a distance that is small as compared with the wheelbase in the vehicle by the driving speed, with the result that the time interval within which an occurrence of two shocks is considered to be simultaneous is, in any case, considerably shorter than the time within which the roughness of the roadway triggers two simultaneous shocks in two wheels which are disposed on a following axle that is common with regard to the driving direction.

The roughness of the roadway which triggers two simultaneous shocks in two wheels on a first axle will also trigger simultaneous shocks in the wheels that are following with regard to the driving direction, with the result that the identification codes transmitted with the simultaneously occurring shock signals can be uniquely allocated to the axles that follow each other. Since simultaneously occurring shocks on wheels with different rolling directions are taken into consideration, the allocation method can, therefore, be finished more quickly.

To determine the rolling direction of the wheel, use is, preferably, made of an acceleration sensor, more particularly an acceleration sensor which responds to tangential accelerations of the wheel. Here, the acceleration component occurring in the circumferential direction of the wheel during acceleration or deceleration of the vehicle is referred to as tangential acceleration. If the wheel electronics are mounted to the wheels of the vehicle in corresponding installation positions, then the sign of the acceleration signal allows distinguishing between right-hand and left-hand wheels. An acceleration sensor on a wheel on the right-hand side of the vehicle and an acceleration sensor on a wheel on the left-hand side of the vehicle supply acceleration signals with opposite signs while the vehicle is accelerated or decelerated.

The rolling direction of the wheel can, however, also be determined by evaluating the signals of two acceleration sensors which are attached to the wheel in different orientations, more particularly a sensor that responds to radial accelerations and a sensor that responds to tangential accelerations and is arranged perpendicularly thereto. The acceleration sensors can, at the same time, be used as shock sensors.

Since the vehicle is started with an acceleration phase, it is recommended that the identification codes received by the evaluation device which pertain to wheels on the left-hand side of the vehicle and those which pertain to wheels on the right-hand side of the vehicle be determined in the initial acceleration phase. Thereafter, the only thing that has still to be determined is the axle on which a wheel which transmits a specific identification code is arranged, in order to be able to allocate this identification code to a specific wheel position.

For this purpose, the invention takes advantage of the fact that roughnesses of the roadway which are crossed by the vehicle are, often, only felt by the wheels on the right-hand side of the vehicle or by the wheels on the left-hand side of the vehicle because only the wheels on the right-hand side of the vehicle or the wheels on the left-hand side of the vehicle are running over the roughnesses. According to the invention, the wheel electronics, therefore, have a sensor which responds to shocks occurring on the particular wheel. A sensor that is particularly suitable as a sensor which responds to shocks is an acceleration sensor, more particularly an acceleration sensor which responds to radial accelerations of the wheel. If, for example, a left-hand front wheel of a vehicle receives a shock because it is running over a roughness of the roadway, said shock being registered and signaled by the shock sensor in the wheel electronic device of the left-hand front wheel, then it is most probable that the left-hand rear wheel of the vehicle will also run over the same roughness of the roadway and receive a shock shortly thereafter, said shock being registered and signaled by the shock sensor of the wheel electronic device provided on the left-hand rear wheel. The time interval elapsing between the occurrence of the shocks on the front and rear wheels is determined by the wheelbase between the front wheel and the rear wheel and by the current velocity of the vehicle. The time interval results from the wheelbase by dividing said wheelbase by the current velocity of the vehicle. If the current velocity and the time interval elapsing between the occurrence of a shock signal which is signaled by the wheel electronic device of the front wheel and the occurrence of a shock signal which is signaled by the wheel electronic device of the rear wheel and if the product of this time interval and the current velocity of the vehicle exactly results in the given wheelbase of the vehicle, then it is concluded according to the invention that the two wheels that are arranged one behind the other on the same side of the vehicle have run over the same roughness of the roadway. From this, it follows that the first one of the two identification codes that were communicated one after the other and, as is known, originate from wheels on one and same side of the vehicle is to be allocated to a forward axle while the second identification code that is received at the end of the time interval and originates from a wheel on the same vehicle side is to be allocated to the axle that is arranged therebehind at the known wheelbase. This uniquely determines the wheel positions pertaining to the two identification codes that have been received and evaluated, because the allocation to a specific side of the vehicle had already been determined.

The identification codes of the wheel electronics installed on the other side of the vehicle can be uniquely allocated to the wheel positions on this other side in corresponding manner.

As has already been illustrated above, it is also advantageously possible to evaluate shocks which simultaneously occur on two wheels with different rolling directions on a common axle and are, for example, caused by expansion joints or by changes in the road pavement that extend over the entire width of the roadway and allow a faster allocation of the identification codes to the individual wheel positions.

The allocation method is also suitable for vehicles with more than two axles because, in this case, two axles each also have a known wheelbase which can be used to uniquely allocate the identification codes to the wheel positions just as is the case with a two-axle vehicle, based on the velocity of the vehicle and the time interval elapsing between two shock signals having occurred on the same side of the vehicle.

Insofar as two pairs of twin wheels are arranged on one axle of the vehicle, the identification codes can also be allocated to the wheel positions using the method according to the invention because the same is applicable to the distinction of wheels on the right-hand side from wheels on the left-hand side of the vehicle. For the evaluation of the shock signals supplied by the shock sensors, it can be assumed that shock signals which originate from a wheel electronic device attached to a front wheel lead to shock signals in the two twin wheels that are arranged therebehind at wheelbase distance on the same side of the vehicle with a different frequency. The probability that that wheel of the two twin wheels that is arranged in the track of the front wheel—and this is usually the external one of the two wheels—will receive a shock by the same roughness of the roadway that gave a shock to the front wheel is higher than for the second wheel of the twin that is arranged further inside. Based on the frequency of the occurrence of the shock signals, it is possible to distinguish the two twin wheels which are arranged on the same side of the vehicle.

The test to check whether the length which results from the multiplication of the velocity of the vehicle by the time interval elapsing between shock signals that were successively signaled by wheel electronics on the left-hand side of the vehicle and the wheel electronics on the right-hand side of the vehicle, respectively, corresponds to a given wheelbase of the vehicle appropriately does not contain any test to check whether the determined length precisely corresponds to the given wheelbase. In lieu thereof, it is checked whether the determined length corresponds to a given wheelbase of the vehicle within a specified tolerance. The deviation of the determined length from the given wheelbase that can be tolerated can be determined by means of trials. If the tolerance selected is too small, the lengths determined from shock signals obtained from wheels that are arranged one behind the other on a common side of the vehicle will, in many cases, not correspond to the wheelbase with small tolerances, with the result that the allocation method will take an unnecessarily long time. If the tolerance selected is too large, the resulting allocation may be inaccurate if it is determined by shock signals which are actually not correlated with each other.

The reliability of the allocation method according to the invention can be increased if the allocations are formed repeatedly and evaluated statistically by selecting the allocations that are occurring most frequently and storing them in a memory which is provided in the evaluation device or in connection with the evaluation device. The higher the number of shock signals evaluated, the more clearly will the correct allocations establish themselves as compared with the incorrect allocations.

Mathematically, the statistical evaluation can be made such that a matrix is formed in the evaluation device, wherein a field is provided for every potential pair of wheel position and identification code, with an allocation determined for the particular pair being entered in the field as a hit with a value of "1" which is incremented by "1" with each further hit. As soon as the frequency of allocations of an identification code to a specific wheel position is clearly higher than that of allocations of the same identification code to other wheel positions, e.g., five times as often as the other allocations, the allocation that occurs most frequently is stored. Once all identification codes have been allocated to a wheel position in this manner, the allocation method is finished. Signals which are subsequently transmitted by wheel electronics will be allocated to that wheel position that is stored under the identification code contained in the signal. This allocation remains preserved until it is replaced by a different allocation. It is appropriate to re-apply the allocation method according to the invention whenever the vehicle is restarted. It will not be before the re-applied allocation method has resulted in a deviating allocation that the deviating allocations will be stored in the stead of the allocations stored up to that point.

The method according to the invention has essential advantages:

The method allows automatic and reliable allocation of the wheel electronics to the particular wheel positions.

The method can be applied without any particular technical complexity. Most of today's wheel electronics are already equipped with acceleration sensors which respond to a tangential acceleration and/or a radial acceleration of the wheel. Therein, the sensors may be separate sensors but it may also be what is called a multi-axle acceleration sensor which can detect tangential accelerations as well as radial accelerations.

The information about the velocity of the vehicle, which is required for evaluating the shock signals, is always available in a road vehicle. Today's speedometers provide an electric velocity signal which can, for example, be supplied to the evaluation device that is provided according to the invention via a BUS system.

The occurring shock signals are signals that are relatively slow. After having been received, these signals can be readily transmitted via an inexpensive BUS system which is designed for slow signals and is largely routine in today's vehicles.

The method according to the invention does not require any particular position of the antenna which is used to receive the signals transmitted by the wheel electronics. For this reason, it is possible to use an antenna which is simultaneously used for another radio system, e.g., an antenna that is arranged centrally on the underside of the vehicle and is able to receive radio signals transmitted by a remote key of the vehicle.

A complex comparison of the signals used for the allocation method with the signals of an ABS system, which is required for the allocation method proposed in EP 0 806 306 B1 is not required according to the invention.

A separate evaluation device is not required for the method according to the invention; the evaluation can, rather, be carried out in an onboard computer or control unit that is already available in the vehicle, said onboard computer or control unit comprising a processing unit, e.g., a microprocessor.

The test to check whether the length which results from the multiplication of the velocity of the vehicle by the time interval elapsing between shocks having been successively signaled by wheel electronics on one and the same side of the vehicle corresponds to a given wheelbase of the vehicle within a specified tolerance, can, e.g., be conducted as follows: Each time the evaluation device registers a shock signal, the evaluation device opens a time window the start and end of which are defined with the measured vehicle velocity taken into consideration such that the identification code in a subsequent signal which originates from a wheel on the same vehicle side and occurs in the opened time window is allocated to a wheel or a wheel position which is arranged on the same vehicle side at the given wheelbase distance from a wheel that is arranged further to the front. The identification code contained in the preceding signal can be allocated to the position of the wheel that is arranged further to the front and from which this preceding shock signal arrived. In this embodiment of the allocation method, the width of the time window corresponds to the tolerance within which the length calculated by multiplying the time interval specifying the width of the time window by the velocity of the vehicle would correspond to the given wheelbase of the vehicle.

While driving, the output signal of an electric or electronic speedometer which is already present in the vehicle is, appropriately, continuously supplied to the evaluation device. Preferably, a digital output signal of the speedometer is supplied to the evaluation device. The evaluation device can access the output signal of the speedometer at any time and as required.

Preferably, the method is applied such that a test is carried out in the wheel electronics to check whether the amplitude of a shock signal which is formed by the shock sensor as a response to a shock exceeds a given threshold value. If—as is preferred—an acceleration sensor is used as a shock sensor, it is checked whether the measured acceleration exceeds a given threshold value. Only if the amplitude of the shock signal or, in case of an acceleration sensor, the amplitude of an acceleration signal exceeds the given threshold value and the allocation method has not been finished yet, will the transmitter in the wheel electronic device be initiated to immediately transmit a signal which contains the required information about the shock, the rolling direction and the identification code. In this manner, the sensitivity of the shock sensor can be automatically adjusted to the conditions of the roadway by setting the threshold for a bumpy roadway higher than for a smooth roadway. This is to advantage in that unnecessary transmission steps which are at the expense of the service life of a battery provided in the wheel electronic device are avoided and that the allocation method is particularly reliable in its application because it mainly concentrates on the evaluation of distinctly occurring shocks which are correlated in pairs. The decision on when signals are transmitted which signal an abnormal tire inflation pressure is to be taken independently of the decision on which ones of the shock signals registered in the wheel electronic device are to be transmitted and which ones not. As is known as such, the decision on when and how abnormal pressures are signaled is taken according to other criteria, e.g., whether the values fall below or exceed specified pressure thresholds and whether specified limits for the rate at which the pressure changes are exceeded.

The threshold value of the strength of the shock signal which, if exceeded, is to trigger a transmission step in the wheel electronic device does not have to be specified invariable but is, preferably, variable. If shock signals are not transmitted for a prolonged period of time, this can be considered to be an indication of a threshold value that has been selected too high. If, however, shock signals are transmitted too often and cannot be correlated with a wheelbase given in the vehicle too often, e.g., because shock signals are noisy, then this indicates a threshold value that has been selected too low. In either case, this gives reason to adjust the threshold value.

If an acceleration sensor is used as shock sensor, the value used as threshold value, preferably, is within a range from 2 g to 4 g (with g standing for the gravitation acceleration). This allows ensuring that weak shocks which would lead to noisy signals remain unconsidered and that the number of shock signals transmitted is adequately high, wherein said shock signals can be well evaluated. If shock signals that can be well evaluated do not occur within time intervals of a few minutes, then this gives reason to change the set threshold value.

If shock signals are not transmitted for a prolonged period of time, e.g., for a few minutes, even if the threshold is set to a low value, then this might indicate that the roadway is too smooth to supply shocks that can be evaluated. In this case, it is advantageous to switch off the shock sensor for some time in order to save electric current until the vehicle again moves on a roadway with major roughnesses. The shock sensor can be switched off for certain time segments, e.g., for one minute each, in order to re-check thereafter whether shock signals that can be evaluated can be received.

Further shock sensors can be arranged on shock absorbers or on wheel suspensions or on springs of the vehicle, e.g., on steel springs, on pneumatic springs or other vehicle suspensions. This allows evaluating only such shock signals that are simultaneously transmitted by one of the further shock sensors, preferably via a cable, and wireless by a wheel electronic device. This allows ensuring to a greater extent that only those shocks are evaluated which can actually contribute to allocating the wheel electronics to a wheel position. If, over and above this, the evaluation device is informed about the shock absorber or the wheel suspension of the vehicle from which a received shock signal originates—be it because it is provided with a corresponding identification code or because it is supplied to the evaluation device via its own input which represents a specific wheel position—then it is even possible to refrain from the rolling direction detection and from the evaluation of the vehicle velocity.

In a slimmed-down version of the method according to the present invention which is the subject of claim 12, evaluation of the rolling direction is refrained from. The slimmed-down method allows detecting the axle on which a wheel electronic system with a specific identification code is arranged. The slimmed-down version of the method is to advantage in that it does not require a sensor for detecting the rolling direction. If use is made of an acceleration sensor, then it needs only one single sensitive axle, more particularly respond to radial accelerations. Such a sensor is more cost-effective than a two-axle sensor which, additionally, also responds to a tangential acceleration.

BRIEF DESCRIPTION OF THE DRAWING

The present invention will be more fully understood from the accompanying drawing which should not be taken to be a limitation on the invention, but is for explanation and understanding only.

FIG. 1 is a flowchart of the invention.

The invention claimed is:

1. A method for allocating identification codes which are contained in signals which are transmitted by components of a tire pressure monitoring system of a vehicle, said components being attached to wheels of the vehicle on which the vehicle is driving—said components being hereinafter referred to as wheel electronic devices—to the positions of the wheels on the vehicle,
   wherein the wheel electronic devices each comprise a plurality of sensors,
   one of said sensors responds to the tire pressure of the wheel,
   one of said sensors provides information about the rolling direction of the wheel,
   one of said sensors responds to shocks occurring on the wheel,
   a memory with the individual identification code of the particular wheel electronic devices stored therein,
   and a transmitter transmitting signals, which contain not only the individual identification code of the particular wheel electronic device but also information about the rolling direction of the particular wheel and about the occurrence of a shock on the same wheel, from the transmitter to a receiver which is provided with or connected to an antenna as well as provided with or connected to an evaluation device,
   and furthermore supplying a velocity signal indicating the driving speed of the vehicle is, to the evaluation device;
   the evaluation device registers the identification codes and rolling direction information contained in the signals received,
   based on the registered rolling direction information, distinguishes identification codes pertaining to wheel electronic devices on wheels on the left-hand side of the vehicle from identification codes pertaining to wheel electronic devices on wheels on the right-hand side of the vehicle,
   distinguishes shocks about which it was informed by wheel electronic devices on the left-hand side of the vehicle from shocks about which it was informed by wheel electronic devices on the right-hand side of the vehicle,
   measures the time interval between shock signals successively signaled by wheel electronic devices on the left-hand side of the vehicle or by wheel electronic devices on the right-hand side of the vehicle, respectively,
   multiplies the measured time interval by a velocity of the vehicle that was measured within the same time interval and signaled to the evaluation device, checks whether the length resulting from this multiplication corresponds to a given wheelbase of the vehicle within a specified tolerance,
   in case of correspondence, allocates the identification code contained in the signal having contained the information about the first one of two successively registered shocks on the left-hand side or of two successively registered shocks on the right-hand side of the vehicle to the left or right wheel, respectively, on a forward one of the two axles during forward driving and allocates the identification code contained in the signal having contained the information about the second one of the two successively registered shocks to the wheel on the rearward one of the two axles on the same side of the vehicle as that on the forward axle.

2. The method according to claim 1, wherein, during rearward driving, the first shock of two shocks which occur on one and the same side of the vehicle at a time distance which corresponds to the wheelbase divided by the driving speed is allocated to the rearward axle and the subsequently occurring shock is allocated to the forward axle.

3. The method according to claim 1, wherein each time the evaluation device registers a shock signal, the evaluation device opens a time window the start and end of which are defined with the measured vehicle velocity taken into consideration such that the identification code in a subsequent shock signal which originates from a wheel on the same side of the vehicle and occurs in the opened time window is allocated to a wheel which is arranged on the same side of the vehicle at the given wheelbase distance from a wheel that is arranged further to the front on the same side of the vehicle, with the identification code contained in the shock signal having previously arrived from a wheel electronic device arranged on the same vehicle side.

4. The method according to claim 1, wherein, whenever the evaluation device simultaneously registers two shock signals which indicate that they originate from two wheels with different rolling direction, the identification codes transmitted with the two shock signals are allocated to two wheels on a common axle.

5. The method according to claim 1, wherein a digital output signal of an electric or electronic speedometer of the vehicle is continuously supplied to the evaluation device while driving.

6. The method according to claim 1, wherein the allocations are formed repeatedly and evaluated statistically by selecting allocations, which occur remarkably often, and storing said allocations in a memory which is provided in the evaluation device or in connection with the evaluation device, and that the allocation method is finished after an allocation is in this manner stored for all identification codes received.

7. The method according to claim 6, wherein the allocations are stored until they are changed by a further allocation method that has been started on a restart of the vehicle.

8. The method according to claim 1, wherein, to determine the rolling direction of the wheel, use is made of an acceleration sensor.

9. The method according to claim 1, wherein an acceleration sensor is used as the sensor that responds to shocks.

10. The method according to claim 1, wherein a test is carried out in the wheel electronics to check whether the strength of a shock signal supplied by the shock sensor exceeds a given threshold value and the transmitter of the wheel electronics is initiated to immediately transmit a signal only if this is the case, provided the allocation method has not been finished.

11. The method according to claim 10, wherein the threshold value is reduced if shock signals are not transmitted for a prolonged period of time and that the threshold value is increased if the transmitted shock signals are, often, not correlated with a wheelbase existing in the vehicle.

12. The method according to claim 11, wherein the shock sensors are switched off for a specific time if shock signals are not transmitted by a wheel electronic device, not even with reduced threshold value.

13. The method according to claim 1, wherein further shock sensors are arranged on shock absorbers or wheel suspensions or springs of the vehicle and only such shock signals are evaluated which are simultaneously transmitted by one of the further shock sensors, preferably via a cable, and wireless by a wheel electronic device.

14. A method for allocating identification codes which are contained in signals which are transmitted by components of a tire pressure monitoring system of a vehicle, said components being attached to wheels of the vehicle on which the vehicle is driving—said assemblies hereinafter being referred to as wheel electronics to the positions of the wheels on the vehicle, wherein the wheel electronics each comprise a plurality of sensors, one of said sensors responds to the tire pressure of the wheel, one of said sensors responds to shocks occurring on the wheel, a memory with the individual identification code of the particular wheel electronic system stored therein, and a transmitter transmitting signals, which contain not only the individual identification code of the particular wheel electronic device but also information about the occurrence of a shock on the same wheel, from the transmitter to a receiver which is provided with or connected to an antenna as well as an evaluation device, and furthermore supplying a velocity signal indicating the driving speed of the vehicle is, to the evaluation device;

the evaluation device registers the identification codes contained in the signals received, measures the time interval elapsing between shock signals that are received successively, multiplies the measured time interval by a velocity of the vehicle that was measured within the same time interval and signaled to the evaluation device, checks whether the length resulting from this multiplication corresponds to a given wheelbase of the vehicle within a specified tolerance, in case of correspondence, allocates the identification code contained in the signal having contained the information about the first of two successively registered shocks to a forward one of the two axles and allocates the identification code contained in the signal having contained the information about the second of the two successively registered shocks to the rearward one of the two axles.

15. The method according to claim 8, wherein an acceleration sensor which responds to tangential accelerations of the wheel is used as the acceleration sensor.

16. The method according to claim 9, wherein an acceleration sensor which responds to radial accelerations the wheel is used as the sensor that responds to shocks.

* * * * *